United States Patent [19]

Tanaka

[11] Patent Number: 4,638,691
[45] Date of Patent: Jan. 27, 1987

[54] CONTROL DEVICE OF AN INFINITELY VARIABLE TRANSMISSION

[75] Inventor: Hirohisa Tanaka, Tokyo, Japan

[73] Assignee: Nippon Seiko Kabushiki Kaisha, Tokyo, Japan

[21] Appl. No.: 638,785

[22] Filed: Aug. 8, 1984

[30] Foreign Application Priority Data

Aug. 19, 1983 [JP] Japan ............................ 58-150264

[51] Int. Cl.⁴ ...................... B60K 41/18; F16H 15/00
[52] U.S. Cl. ...................................... 74/866; 74/856; 74/190.5
[58] Field of Search ............... 74/866, 854, 856, 864, 74/867, 200, 190, 190.5; 364/424.1

[56] References Cited

U.S. PATENT DOCUMENTS

| | | | |
|---|---|---|---|
| 4,262,783 | 4/1981 | Scarrott et al. | 74/866 X |
| 4,285,252 | 8/1981 | Yamaki et al. | 74/866 |
| 4,297,918 | 11/1981 | Perry | 74/200 X |
| 4,383,456 | 5/1983 | Ganoung | 74/866 |
| 4,464,952 | 8/1984 | Stubbs | 74/866 |
| 4,466,521 | 8/1984 | Hattori et al. | 74/866 X |
| 4,481,843 | 11/1984 | Jarvis et al. | 74/866 |
| 4,481,844 | 11/1984 | Ironside et al. | 74/866 |
| 4,488,456 | 12/1984 | Taga et al. | 74/866 |
| 4,509,125 | 4/1985 | Fattic et al. | 74/866 X |
| 4,526,051 | 7/1985 | Kraus | 74/867 X |

Primary Examiner—Leslie A. Braun
Assistant Examiner—David Novais
Attorney, Agent, or Firm—Shapiro and Shapiro

[57] ABSTRACT

A device for automatically speed-change-controlling an infinitely variable transmission of a running vehicle according to the running mode of the vehicle selected by the driver is disclosed. The infinitely variable transmission includes a transmission device for transmitting rotation from the input side to the output side and a speed changing device controlled by a hydraulic cylinder. The device is provided with a hydraulic pressure source, a hydraulic circuit connected to the hydraulic pressure source and communicating with the hydraulic cylinder, a high-speed solenoid valve incorporated in the hydraulic circuit, and an electronic control device for calculating a predetermined gear ratio conforming to the running mode and digitally controlling the operation of the high-speed solenoid valve.

1 Claim, 1 Drawing Figure

U.S. Patent  Jan. 27, 1987  4,638,691
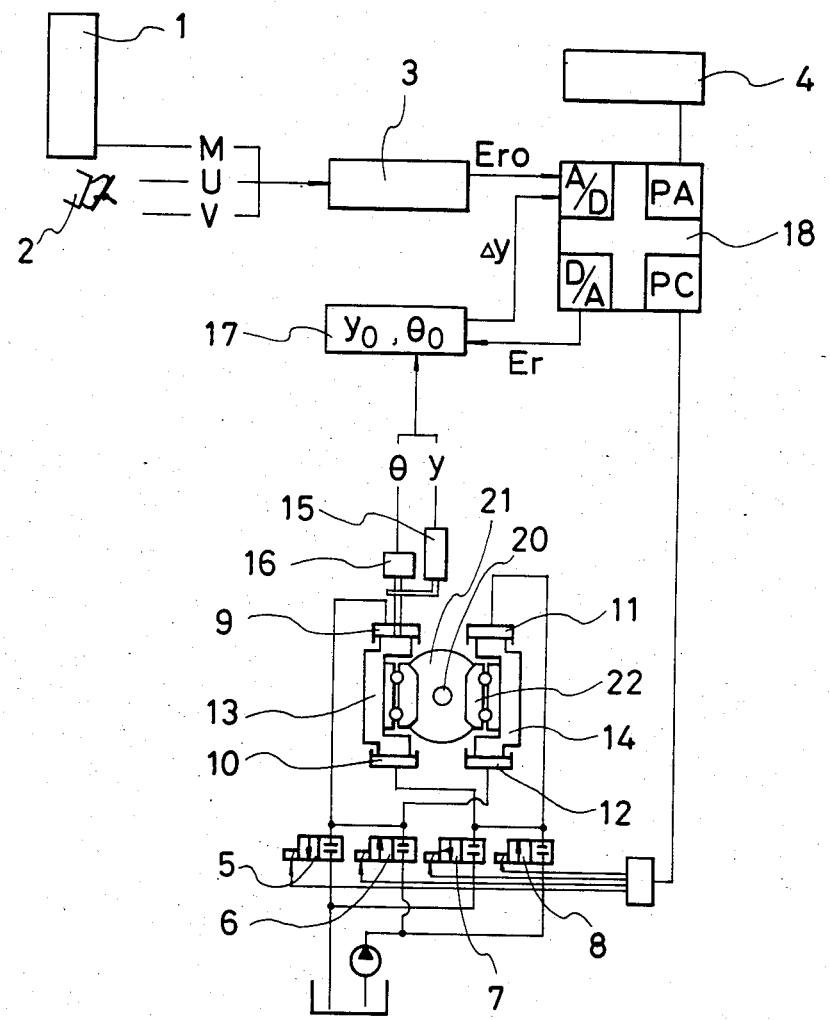

CONTROL DEVICE OF AN INFINITELY VARIABLE TRANSMISSION

BACKGROUND OF THE INVENTION

1. Field of the Invention

This invention relates to a device for controlling the transmission gear ratio of an infinitely variable transmission to a suitable gear ratio conforming to the running mode of a vehicle.

2. Description of the Prior Art

Electro-hydraulic servo systems using a spool valve type electro-hydraulic servo valve or a rotary servo valve have been popular as the conventional control device of infinitely variable transmissions. Such systems are costly because of the use of the servo valve, are complicated in structure, and have reliability problems caused by the influence of dust. Moreover, they suffer from other problems, including the problem that the speed control becomes unstable when electronic or mechanical abnormality occurs.

SUMMARY OF THE INVENTION

The present invention eliminates all of the above-noted problems peculiar to the prior art. It does not use the servo valve but instead digitally controls the opening-closing of a high-speed solenoid valve.

The invention will become fully apparent from the following detailed description thereof taken in conjunction with the accompanying drawing.

BRIEF DESCRIPTION OF THE DRAWING

The single FIGURE of the drawing shows the entire system in which the present invention is applied to a toric type infinitely variable transmission.

DESCRIPTION OF THE PREFERRED EMBODIMENT

An embodiment in which the present invention is applied to a toric type infinitely variable transmission will hereinafter be described.

In a toric type infinitely variable transmission, as is well known, a plurality of traction rollers 22 are disposed so as to be forced into engagement with the toric surface of an input (output) disk 21 provided on a coaxially disposed input (output) shaft 20, so that a large torque may be transmitted by a traction force created at the engaged surface. Trunnion devices 13 and 14 rotatably supporting the traction rollers 22, and each supported on a housing for pivotal movement about a pivot axis which is perpendicular to the rotary shafts of the traction rollers and the input and output shafts, may be moved in the direction of the pivot axis, whereby the trunnion devices 13 and 14 may be pivoted in opposite directions to thereby vary the engagement radius on the input (output) disk 21 and vary the transmission gear ratio.

Reference numerals 9, 10, 11 and 12 designate hydraulic cylinders for moving the trunnion devices 13 and 14 in the direction of the pivot axis, and reference numerals 5, 6, 7 and 8 denote high-speed solenoid valves incorporated in the hydraulic pipings to the above-mentioned cylinders. Reference numerals 15 and 16 designate detectors for detecting the amount of movement y of the trunnion device 13 in the direction of the pivot axis and the amount of pivotal movement angle $\theta$ of the same trunnion device about the pivot axis, respectively.

The principle of the speed change control operation of this infinitely variable transmission will now be described. Reference numeral 1 designates mode switches in which the relation among optimum conditions such as the break torque, output horsepower, fuel consumption and engine speed and the vehicle speed and the optimum transmission gear ratio is stored as electronic memory. When the driver switches in by selecting one of the desired driving patterns M from among said various modes and the vehicle is running or when the driver starts the vehicle from its stopped state, if the driver attempts to change the amount of depression of an accelerator pedal 2 and impart a variation to the vehicle speed, the control circuit in a control amplifier 3 calculates the pre-stored optimum transmission gear ratio Ero from the signal of the accelerator opening Y and the vehicle speed V in conformity with the said selected mode and supplies the data Ero to a central processing unit 18.

The speed change mode required of the transmission, that is, each position such as automatic speed change, fixed 3rd-speed, fixed 2nd-speed, fixed 1st-speed, neutral or reverse is selected by a shift switch 4 and the signal produced thereby is also supplied to the central processing unit 18.

Thus, the central processing unit 18 processes the relation between the optimum transmission gear ratio Ero from the mode switch 1 and the speed change mode signal from the shift switch 4 and calculates the suitable gear ratio Er, and puts out a pulse signal for opening and closing the high-speed solenoid valves 5-8 and operates these valves at intervals of several tens-microseconds in association with one another, thereby controlling the amount of oil flowing into or out of the cylinders 9-12 and moving the trunnions 13 and 14 by a target valve yo along the respective pivot axes and in opposite directions, as a result of which the trunnions rotate a predetermined amount $\theta$o in opposite directions. By virtue of this operation, the radius of the engagement circle on the input (output) disk 21 of the traction rollers 22 is varied as previously described and speed change control is effected so as to provide the value of the suitable gear ratio Er.

The amount of movement y and the amount of rotation angle $\theta$ are detected by detectors such as a linear potentiometer 15 and a rotary potentiometer 16, respectively, and are supplied as the data to a control amplifier 17. The suitable gear ratio Er is imparted to the control amplifier 17 from the central processing unit 18 and the error $\Delta$y between the amount of movement y and the target value yo is calculated so that the transmission gear ratio, i.e., the amount of rotation angle $\theta$, is made coincident with the amount of rotation angle $\theta$o corresponding to the suitable gear ratio, i.e., Er, and control is effected so that said error becomes zero.

Also, a pulse width modulating circuit for controlling the opening time of the high-speed solenoid valves 5-8 to accelerate the speed of the amount of movement y and reduce the speed change time can be incorporated into the central processing unit 18.

The above-described embodiment of the present invention is an example relating to the speed change control of a toric type infinitely variable transmission, but it is quite equally applicable to other types of infinitely variable transmission using a hydraulic cylinder to effect a speed change, such as a belt type infinitely variable transmission. As previously described, the invention is low in cost and is less affected by disturbance or dust and provides a stable speed changing operation.

What I claim is:

1. An automatic control system for a toric type infinitely variable transmission of a running vehicle, the speed of which is changed by varying a gear ratio corresponding to a running mode of the vehicle selected by a driver, said transmission comprising coaxially disposed input and output shafts with input and output disks having toroidal surfaces and respectively secured to the input and output shafts, a traction roller engaged with the toroidal surfaces of the disks and a trunnion rotatably supporting the traction roller on a rotary shaft, said trunnion being linearly movable in the direction of a pivot axis which is perpendicular to the rotary shaft of the traction roller and being pivotable around the pivot axis so that the gear ratio between the input shaft and the output shaft may be changed, said control system comprising:

a hydraulic cylinder receiving an axial end of the trunnion;

a hydraulic circuit connecting the hydraulic cylinder with a hydraulic source, said hydraulic circuit including a solenoid valve, said valve having means for repeatedly opening and closing the valve at predetermined intervals and controlling hydraulic supply to said hydraulic cylinder and thereby controlling the linear movement of the trunnion in the direction of the pivot axis so as to vary the gear ratio;

first detector means for detecting the amount of the linear movement of the trunnion in the direction of the pivot axis and producing a first signal;

second detector means for detecting the amount of the pivotal movement of the trunnion and producing a second signal; and an electronic control circuit for receiving said first and second signals from said first and second detector means, determining a suitable gear ratio conforming to the running mode and said signals and feeding a pulse signal according to the suitable gear ratio back to the solenoid valve in order to open and close the solenoid valve at the predetermined intervals.

* * * * *